Dec. 9, 1969  G. E. INSHAW  3,482,321
DIGITAL MICROMETER

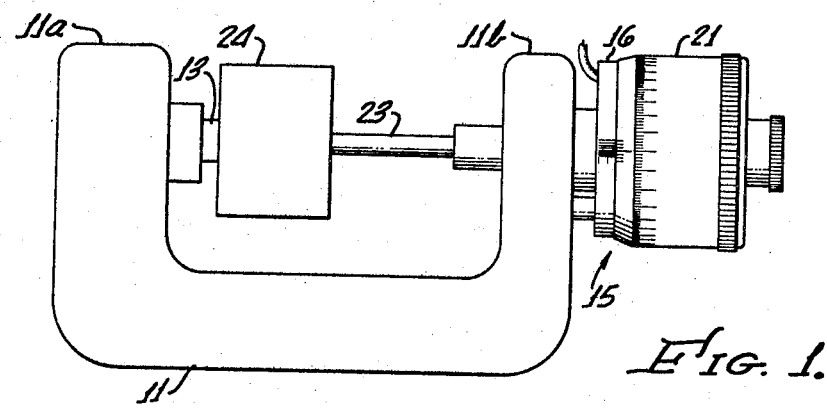
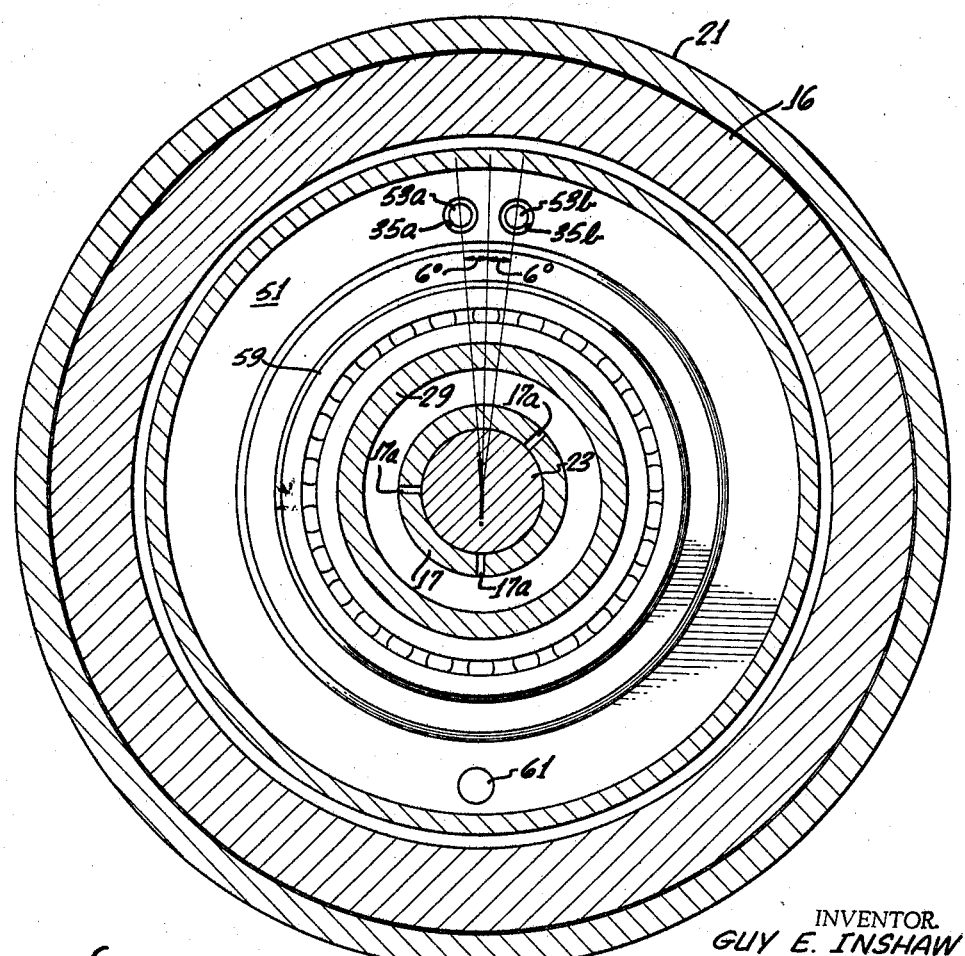

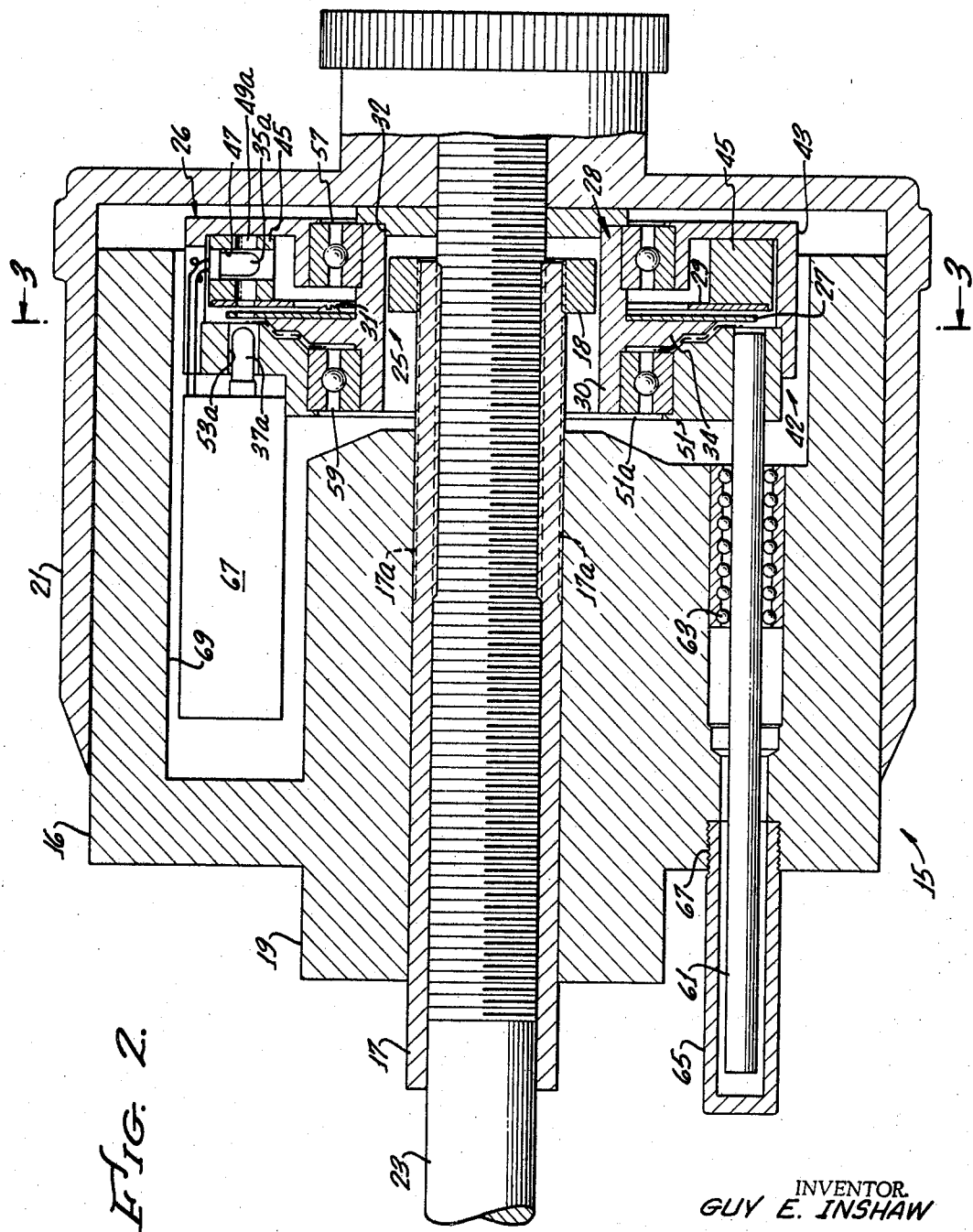

Filed Sept. 4, 1968  5 Sheets-Sheet 3

INVENTOR.
GUY E. INSHAW
BY
FOWLER, KNOBBE
& MARTENS
ATTORNEYS.

United States Patent Office 3,482,321
Patented Dec. 9, 1969

3,482,321
DIGITAL MICROMETER
Guy E. Inshaw, Newport Beach, Calif., assignor to IKL Incorporated, a corporation of California
Filed Sept. 4, 1968, Ser. No. 757,369
Int. Cl. G01b 3/18
U.S. Cl. 33—166                                    15 Claims

ABSTRACT OF THE DISCLOSURE

A conventional micrometer having a digital rotary encoder housed within its barrel. The encoder is of the optical type, with a code disk mounted for rotation with the lead screw of the micrometer, and a pair of light sensors non-rotatably mounted adjacent the disk. Rotation and axial movement of the lead screw is converted by the encoder into a pair of sinusoidal voltages phased 90° apart and means are also provided, external to the micrometer, for converting these voltages into an easily readable numerically displayed form.

---

The present invention relates to measuring devices and in particular to a micrometer provided with an electrical output suitable for digital processing, decimal display and print-out.

The conventional precision micrometer is one of the most widely used instruments for the accurate measurement of small distances. Typically it comprises a lead screw attached to a cylindrical thimble and threadedly mounted in a cylindrical barrel member which is slightly smaller than and housed within the thimble. In performing a measurement, the thimble and the attached lead screw are turned relative to the barrel and the amount of travel is used as an indication of the measured distance. The extent to which the lead screw has been turned is measured by means of three sets of calibrations . . . two on the barrel and the other on the thimble. One set of calibrations on the barrel extends axially along its surface and serves as a relatively coarse indication. The calibrations on the thimble, on the other hand, extend around its circumference close to its edge, and these calibrations serve as a finer measurement of lead screw excursion. The other set of calibrations on the barrel include five vernier lines opposite the calibrations on the thimble, and spaced apart slightly differently than the lines comprising the thimble calibrations. These five lines permit a reading even more accurate than that attainable by reading the thimble calibrations.

In making a measurement, three readings are taken. First, the position of the forward edge of the thimble upon the relatively coarse scale which runs along the barrel is noted. Then, to obtain a more precise measure of lead screw excursion, reference is made to the thimble calibrations to determine which one of them is nearest to the coarse axial scale on the barrel. In most cases the axial scale on the barrel will fall between two calibrations on the thimble scale. Its exact position between two such calibrations is determined by a third reading, made by noting which of the five vernier lines on the barrel is most nearly opposite a calibratiton on the thimble scale.

It is apparent that the process is involved, lengthy, and subject to error. It is not unusual for a skilled machinist to take up to 45 seconds to make and write down his three readings and to combine them for determining the actual excursion of the lead screw in making a measurement.

It is not surprising, therefore, that there has been a demand for simplifying the manner in which micrometers are read. Firstly, to permit relatively unskilled personnel to carry out measurements with a micrometer quickly and sceondly to reduce the errors which tend to occur in combining the readings obtained from the three scales.

It is a principal object of the present invention to simplify the reading of precision micrometers to the point where relatively unskilled personnel can obtain accurate readings from it quickly, yet without error.

It is a related object of the present invention to provide a conventional precision micrometer with an electrical output representative of the distance being measured and readily convertible into a displayed or printed number.

A further object of the invention is to provide a conventional micrometer with a digital encoder enclosed completely within its handle and adapted to produce a pair of phased apart alternating signals representative of the sense and extent of the axial movement of the micrometer's lead screw, and this at least to the same degree of accuracy as that which would be attainable by reading the conventional scales on this micrometer.

Yet another more specific object of the invention is to provide a mounting arrangement whereby a digital rotary encoder can be housed completely within the handle of a conventional micrometer, with the rotor of the encoder being mounted for rotation and axial movement with the lead screw of the micrometer and with the stator of the encoder (including a light sensor) being non-rotatably mounted adjacent to the stator for axial movement with both the stator and the lead screw.

Other objects and advantages will become apparent from the following description and from the accompanying drawings in which:

FIGURE 1 is a side view of one type of conventional micrometer adapted to receive a digital encoder within its barrel;

FIGURE 2 is a cross section through FIGURE 1 as best indicated by line 2—2 in FIGURE 3 and showing the location of a digital encoder within the barrel of the micrometer shown in FIGURE 1;

FIG. 3 is a cross section taken along lines 3—3 of FIG. 2 showing the radial position of the principal elements within the micrometer barrel;

Figure 4:
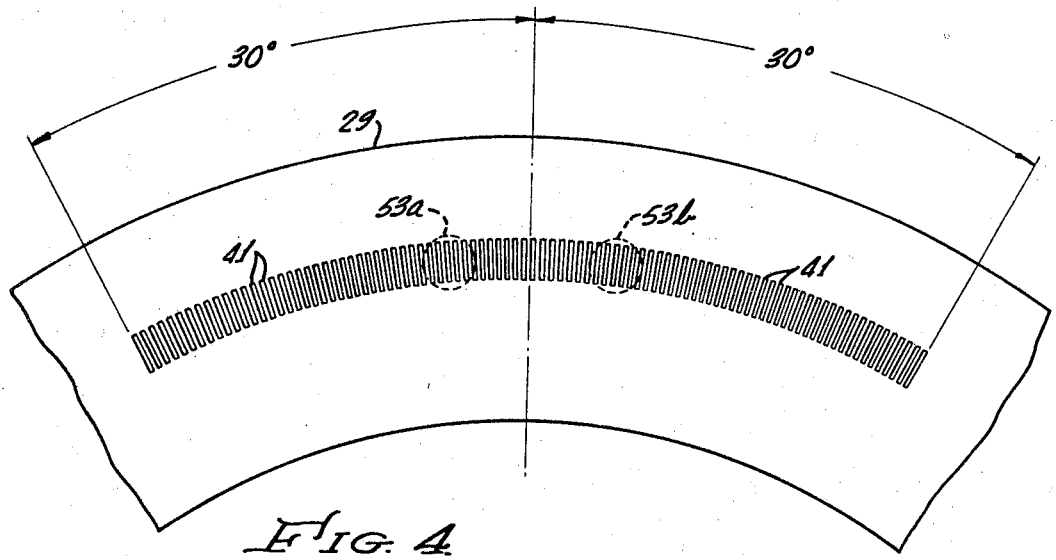
FIG. 4 is a magnified top view, partially broken away, of a stationary slotted disk forming part of an encoder shown in FIG. 2.

Referring more particularly to the drawings, a conventional micrometer is illustrated in FIG. 1. It comprises a generally C-shaped anvil 11 having a stationary stop member 13 mounted upon one of its arms 11a. Mounted in the opposite arm 11b of the handle, in alignment with the stop member 13, is a micrometer head 15, typically including a cylindrical barrel 16 having a shoulder 19 (see FIG. 2) which fits snugly into a corresponding opening in the arm of the anvil 11. Referring now to FIG. 2 in particular, the barrel 16 is almost totally enclosed in a cylindrical cap 21 known as the "thimble." Attached to the thimble 21 and extending axially from it, is a lead screw 23 which is threadedly engaged with and extends coaxially at least partially through the barrel 16. Together, the thimble 21 and the lead screw function as the measuring means of the micrometer. In the particular micrometer shown, the lead screw 23 is held in the barrel 16 by an internally threaded sleeve 17 which is rigidly anchored in the barrel. To permit adjustment of the ease with which the lead screw 23 may be turned within the sleeve 17, the latter is split near its inner end by three axially extending slots 17a and an internally threaded adjusting nut 18 is mounted on the slotted portion of the sleeve. For sake of simplicity, it is assumed that the micrometer as shown in FIGS. 1 and 2 is of the rotating spindle type in which the lead screw terminates in a flat measuring surface or else has attached to it a spindle member having such a surface. It will be understood, however, that the micrometer might also be of the non-rotating spindle type in which event a suitable coupling would be provided between the spindle and the lead screw to permit the lead screw to rotate while maintaining the spindle in a non-rotating position.

To measure a given dimension of an object, shown in FIG. 1 as a block 24, the block is placed between the stop member 13 and the lead screw 23 and the thimble 21 is turned until the lead screw 23 abuts against the block 24. An accurate measurement of the required dimension is obtained from the lead screw 23 by means of three sets of calibrations, two of them on the barrel 16 and a third set extending around the circumference of the thimble 21 along its edge nearest the barrel.

The type of micrometer illustrated in FIG. 1 is most suitable for portable applications. At other times, however, the anvil 11 is dispensed with and the micrometer head 15 is mounted with its lead screw 23 positioned against the side of an object whose position, size or movement is to be determined. The term "micrometer," as used herein, refers to an instrument of the type shown in FIG. 1, with or without the anvil 11.

In accordance with the invention there is housed within a space provided between the barrel 16 and the thimble 21 a rotary code converter, including a code member mounted for rotation with the lead screw 23 and carrying a plurality of regularly spaced indicia distributed in a circular array. Mounted adjacent to the code member, slideably but non-rotatably relative to the barrel 16, is a detecting means for producing an electrical signal in response to movement of the code disk indicia past it. In a particular line or digital micrometers which have been successfully manufactured in accordance with the invention, the entire code converted is less than 3.5 inches in diameter. The encoder comprises two principal parts, a rotor asesmbly 25 and a stator asesmbly 26. The rotor assembly 25 includes as its prinicpal component a code disk 27 mounted by means of an annular bracket 28 for rotation with the thimble 21 and its attached lead screw 23, which together comprise the measuring means of the micrometer. As shown in FIG. 2, the rotor bracket 28 includes a tubular hub 30 which is rigidly attached by a force fit to a shoulder 32 on the inner end face of the thimble 21. A generally disk-shaped ledge 34 extends radially from the hub of the bracket 28 and it is upon this ledge that the code disk 27 is mounted by a set of screws 31, one of which is shown in FIG. 2. In this way, the code disc 27 is rigidly mounted upon the lead scerw 23.

Figure 5:
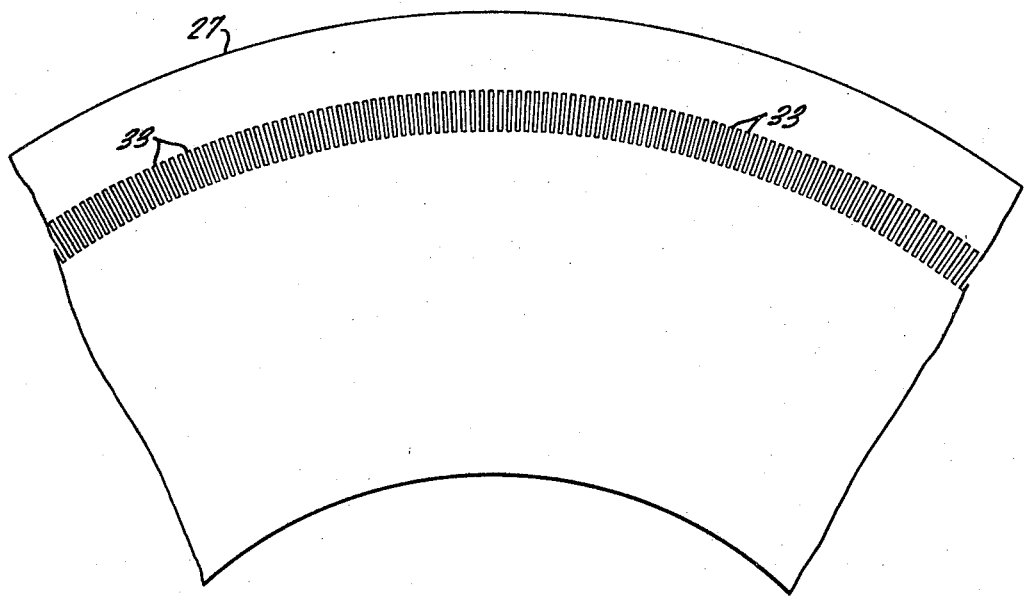
FIG. 5 is a magnified top view, partially broken away, of a rotatably mounted code disk forming another part of the encoder shown in FIG. 2.

Distributed in a circular array around the code disk 27 are a plurality of indicia 33, as best seen in FIG. 5. To detect the arc through which the lead screw 23 and the code disk 27 have been turned, the stator assembly of the encoder includes sensing means which, in the exemplary embodiment, is one of the optical type. It includes a pair of lamps 35a and 35b on one side of the code disk 27 and a pair of photodetectors 37a and 37b mounted in registry with respectives ones of the lamps 35a and 35b on the opposite side of the coded disk. The sensing means additionally includes a second, non-rotating code disk 29 having regularly-spaced slots 41 distributed on its surface opposite the lamps 35a and 35b and in line with the indicia 33 on the code disc 27. As will be explained in more detail subsequently, the function of the non-rotating disc 29 is simply to augment the lamps 35a and 35b and the detectors 37a and 37b in detecting movement of the indicia 33 as the code disk 27 is turned.

As the code disk 27 is turned with the lead screw 23 relative to the non-rotating sensing means of the encoder, it is important that the spacing between the sensing means and the code disk 27 remain constant. Thus, in keeping with the invention, means are provided for mounting the stator assembly 26 of the encoder upon the rotor assembly 25 for joint movement of both assemblies relative to the barrel 16 as the lead screw 23 is turned. Sufficiently, the stator assembly 26 includes an annular housing 42 made up of three parts. The first part is a ring 43 having a generally U-shaped cross section. Attached to and housed within the ring 43 is a second ring 45. Mounted within the ring 45 in a pair of radially extending spaced-apart openings 47 are the lamps 35a and 35b. Each of the openings 47 is intersected at right angles by an axially extending hole 49 for defining the paths of light originating from the lamps 35a and 35b. Also housed within the annular ring 43 is a third ring-shaped member 51. It will be understood that both of the rings 45 and 51 are attached to the first ring 43 by suitable means which are not shown. One of the functions of the third ring 51 is to support the pair of photodetectors 37a and 37b and for this purpose the ring carries a pair of spaced-apart apertures 53 which are in alignment with respective ones of apertures 49 in the second ring 45.

In accordance with a feature of the invention, the axial spacing between the rotor and stator assemblies 25 and 26 and, in particular, the distance between the disks 27 and 29 of those assemblies, is maintained constant, even though the stator assembly 25 is moved axially (along the axis of the lead screw 23) as the lead screw is being turned. Toward this end means are provided, in the form of a pair of bearings 57 and 59, for mounting the entire stator assembly upon the measuring means comprising the thimble 21 and the lead screw 23 so that the stator assembly 26 will be transporated axially by the measuring means along with the rotor assembly 25, thereby maintaining the axial spacing between the rotatable code disk 27 and the non-rotatable sensing means carried by the stator assembly unchanged. In the exemplary embodiment shown, the bearings 57 and 59 are mounted upon the hub 30 of the rotor bracket 28.

An equally important requisite for the proper operation of the encoder is that the stator assembly 26 and the sensing means upon it be free to ride axially with the code disk 27 while being prevented from rotating with it. For this purpose a shaft 61 extends rigidly from the ring 51 of the stator assembly 26 and is slidably journaled in the micrometer barrel 16. In order to reduce to an absolute minimum the motion of the stator assembly 26 relative to the micrometer barrel 16, the anchoring shaft 61 is journaled in the barrel 16 by means of a snugly fitting precision slide bushing 63 which provides very low friction between itself and the shaft 61, thereby offering minimum resistance to axial movement of the stator assembly. In order to protect the protruding end of the anchoring shaft 61, it is completely enclosed by a cover 65 threaded into the barrel 16. It will be understood of course that, while the arrangement of affixing the anchoring shaft 61 to the ring 51 of the stator assembly 26 and providing a sliding engagement for the shaft in the barrel 16 is a suitable one, the shaft could also be rigidly anchored in the barrel 16 with a properly placed sliding connection being provided therefor in the ring 51.

In addition to the anchoring rod 61, the ring 51 also carries certain optional electronic circuitry, shown in FIG. 2 simply as a block 67, for converting the output of the photodetectors 37 into a form particularly useful for digital processing. In the form in which it is shown in FIG. 2, the electronic circuitry may be contained in a suitable canister for which a recess 69 is provided in the barrel 16. Alternatively, however, the recess 69 could be dispensed with and the electronic components, which will be discussed further subsequently might be distributed along the surface 51a of the ring 51.

Turning now to the details of the encoder disclosed in the exemplary embodiment of the invention, its code disk 27 is made of translucent material, and the indicia 33 are in the form of a circular array of regularly spaced, radially extending, alternatively transparent and opaque segments which are distributed symmetrically about the axis of rotation of the disk 27 and therefore of the lead screw 23. In the particular disk shown in FIG. 5, the disk itself has an opaque surface into which transparent slots have been etched. Code disks of this type are well known to those skilled in the art, take several forms and the present invention is not directed to them per se. In the conventional manner of operation of encoders of the type disclosed, light from the respective lamps 35a and 35b passes through their respective apertures 49 and is directed at the code disk 27. Turning of the lead screw 23, and of the code disk 27 therewith, is detected by the photodetectors 37a and 37b as the alternatively opaque and transparent segments cause the light reaching the photodetectors to fluctuate. In order to sharpen and magnify the contrast of these light fluctuations, means are provided for interposing between the lamp 35a and the photodetector 37a on the one hand, and between the lamp 35b and the photodetector 37b on the other hand, a pair of stationary screens, each of which includes a series of alternately opaque and transparent segments. These segments are of the same width as their counterparts on the code disk 27 and are so dimensioned that, as the code disk 27 is turned, its transparent areas are intermittently aligned with the transparent and opaque segments of the stationary screens, thereby alternately blocking light from and transmitting light to the lamps 35. While it is apparent that the screens need only extend substantially over the areas between the lamps 35 and the detectors 37, for manufacturing convenience they are put on a non-rotatably mounted disk 29 in the form of two series of transparent slots 41, each series extending over 30 degrees of arc, with the slots being of the same width and spaced apart by the same amount as the transparent segments, or slots 33, in the code disk 27.

Figure 6:
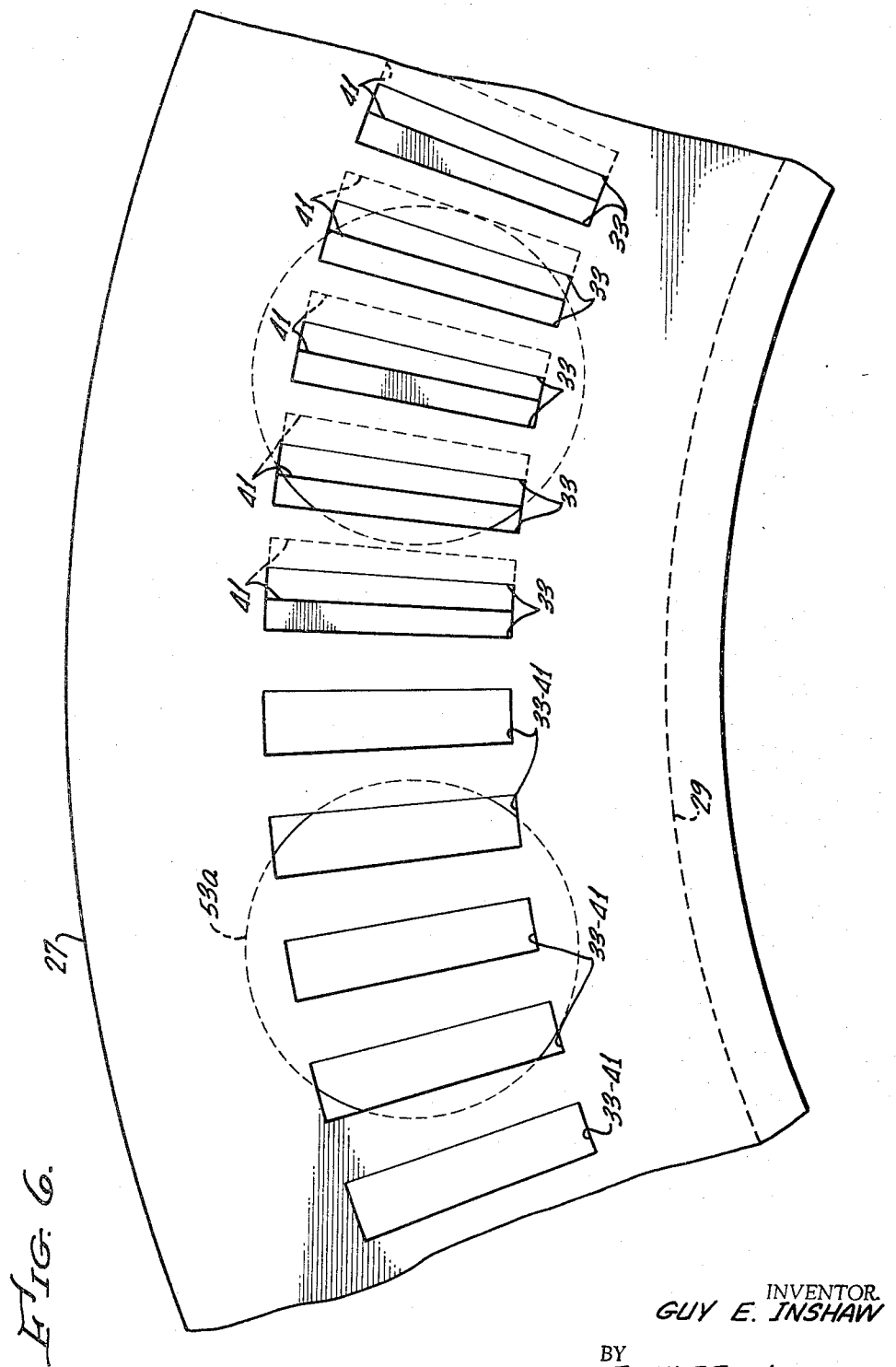
FIG. 6 is a greatly magnified view of the encoder of FIG. 2 showing the relationship of the slotted disk and the rotatably mounted code disk with reference to a pair of photodetecting devices carried by the encoder.
Figure 7:
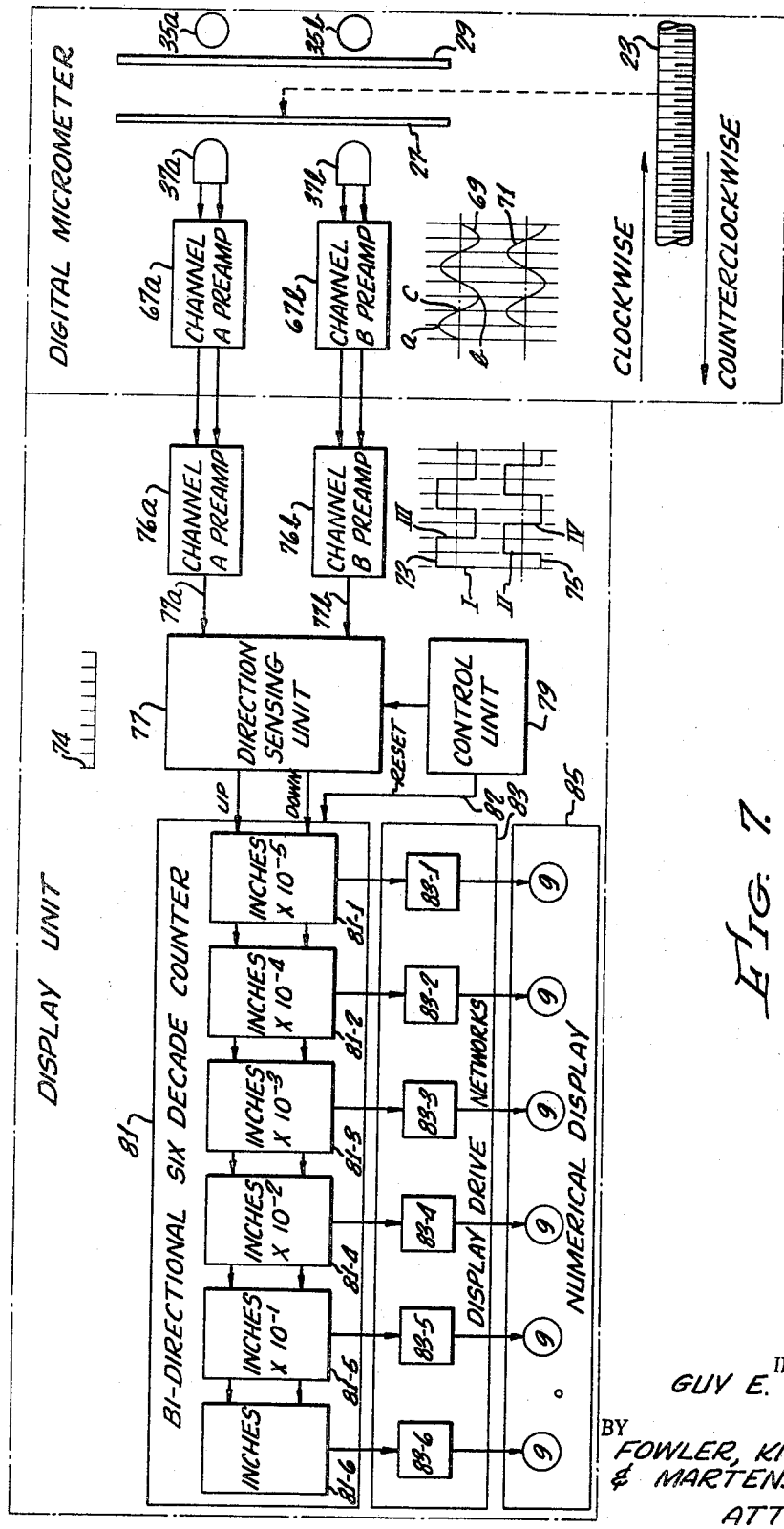
FIG. 7 is a block diagram of a display system suitable for utilizing the output signals produced by the digital micrometer of the invention.

The manner in which the encoder operates will be best understood by observing first how one of its channels, such as that comprising the lamp 35a and the photodetector 37a, hereinafter referred to as Channel A, operates. Referring to FIGS. 6 and 7 in addition to FIG. 2, let it be assumed first that the disks 27 and 29 are so positioned that their slots are in exact alignment opposite the photodetetcor 37a. Under these conditions the amount of light reaching the photodetector 37a from the lamp 35a is at a maximum and accordingly the voltage output from the photodetector 37a will also be at a maximum. This corresponds to a point $a$ on the curve 69 in FIG. 7. Let it be assumed further that the lead screw 23 and the code disk 27 are turned by such an amount that the transparent sections, or slots, 41 in the nonrotating disk 29 are exactly opposite the opaque portions in the rotating disk 27 in the area between the lamp 35a and the photodetector 37a. The light reaching the photodetector 37a now will be at a minimum and its voltage output will also be at a minimum corresponding to the point $b$ on curve 69 in FIG. 7. It can be seen that, when the code disk 27 is positioned midway between the two positions assumed previously, the amount of light reaching the photodetector 37a and the magnitude of its voltage output will be intermediate the amounts of light and voltage outputs corresponding to those two positions, as indicated by point $c$ on the waveform 69 in FIG. 7. Typically, therefore, the voltage output of the photodetector 37a will vary sinusoidally with the rotation of the code disk 27, with the output completing a sinusoidal cycle each time that a new group of openings in the rotary disk 27 is brought into registry with a given set of slots in the stationary disk 29.

If the encoder were to have only one channel, as described thus far, it would produce an output representative of the extent to which the lead screw 23 of the micrometer has been moved. This signal, however, would not be sufficient to indicate the direction in which the lead screw had been turned. Accordingly, for applications of the digital micrometer in which an indication of both sense and extent of excursion is required, there is provided a second channel comprised of the lamp 35b and a photodetector 37b, hereinafter also referred to as Channel B, and adapted to produce a second sinusoidal voltage output which is in quadrature with the output of the first channel, as shown in FIG. 6. This phase relationship is attained by so placing the alternate opaque and transparent sections upon the non-rotating disk 29 in the area of the aperture 53b in which Channel B photodetector 37b is housed, that the transparent slots 33 in that area of the disc are half-covered by the opaque areas on the rotating disk 27 at the same time that the transparent slots 33 and 41 on the two disks are in exact alignment opposite the aperture 53a in which Channel A photodetector 37a is housed. The output of the photodetector 37b is shown as the waveform 71 in FIG. 7 and is seen to differ by 90 electrical degrees from the output of the photodetector 37a represented by waveform 69.

In order to adapt for digital processing the two outputs of the digital encoder described thus far, the electronic circuitry 67 is housed within the recess 69 includes a dual channel preamplifier 67a and 67b by means of which the sinusoidal outputs of the photodetectors 37a and 37b are shaped and amplified to produce a pair of square shaped signals of corresponding phase, as represented by waveforms 73 and 75 in FIG. 7. Due to the quadrature phase relationship between the waveforms 73 and 75, the direction of rotation of the code disk 27 and therefore the sense of excursion of lead screw 23 can be detected by relatively simple logic circuitry, shown in FIG. 7 as the block 77. Let it be assumed, for example, that the output of Channel B lags that of Channel A when the code disk 27 is rotated clockwise and that the relationship is reversed when the code disk is turned counterclockwise, as shown by the relative phasing of the waveforms 73 and 75 in FIG. 7. In this event logic circuitry well known to those skilled in the art may be used to sense clockwise rotation by detecting that a pulse on Channel B begins at a time when there is already a pulse present on Channel A.

Counter-clockwise rotation of the lead screw, on the other hand, is sensed by detecting that a pulse on Channel B occurs at a time when there is no pulse on Channel A.

FIG. 7 further includes, in block form, the principal components of an exemplary digital data display system suitable for utilizing the outputs of the encoder preamplifier channels 67a and 67b. The particular system shown in FIG. 7 was designed for use with a digital micrometer built in accordance with the invention and having a 10 microinch resolution, a resolution so sensitive that the digital micrometer produces a complete signal cycle for every 40 microinches of travel executed by the lead screw 23. For even greater resolution, by electronic means in the data display system, each signal is converted into four separate pulses, each corresponding to 10 microinches of lead screw travel. This resolution may be attained, for example, by the use of a 40 pitch lead screw, traveling one inch for every 40 revolutions, and a 625 slot code disk producing 625 cycles of signal on each of Channels A and B during each complete revolution of the lead screw. This amounts to $40 \times 625 = 2500$ signal cycles per linear inch of lead screw travel, or one signal cycle for every 40 microinches of travel by the lead screw.

In order to attain a separate pulse for every 10 microinches of lead screw travel, the direction sensing unit 77 includes an electronic multiplication logic circuit, well known to those skilled in the art and therefore not shown, for producing four pulses at a selected one of the outputs of the direction sensing unit for each cycle of output fed to it from the digital micrometer. Stated simply, the multiplication logic circuit detects positive going and negative going transitions in the square wave outputs produced in Channels A and B to produce an output pulse each time such a transition occurs. It may be confirmed by reference to the square waveforms 73 and 75 that, during each complete cycle of either one of the waveforms there are a total of four positive going and negative going transitions, such as those marked I, II, III, and IV. A series of pulses 74 produced in response to these and subsequent transitions are shown above the direction sensing unit 77 in FIG. 7.

To prevent malfunctioning of the display unit due to possible deterioration of the signals produced by the digital micrometer at the outputs of its preamplifier channels 67a and 67b during transmission to the remotely located display unit, they are first restored to their original shapes by a pair of preamplifiers 76a and 76b. The outputs of the signal restoring preamplifiers 76a and 76b are applied to a pair of inputs 77a and 77b of the direction sensing unit 77. The unit 77 is provided with an UP output and a DOWN output and is adapted to operate in either one of two modes under the direction of a control unit 79 for a reason which will become apparent shortly. With the direction sensing unit in its first operating mode, its quadrupled output signal derived from the outputs of preamplifier channels 67a and 67b is generated on its UP output when the Channel A signal leads the Channel B signal. If the phase relationship of the Channel A and Channel B outputs is reversed, the output of the direction sensing unit 77 appears on its DOWN output. Alternatively, when the direction sensing unit 77 is switched into its second operating mode, the signal which it generates appears on its DOWN output when Channel B leads Channel A and on its UP output when Channel A leads Channel B.

As explained previously, with the particular system that has been described, each ten millionths of an inch travel of the lead screw 23 is represented by one pulse on one or the other of the outputs of the direction sensing unit 77. depending upon the direction in which the lead screw is being turned. To provide a cumulative count of the number of pulses produced and therefore of the total excursion of the lead screw 23, the outputs of the direction sensing unit 77 are applied to a conventional bi-directional binary coded decimal counter 81. The particular counter 81 shown has six stages, with the first one necessarily having a digital significance of 10 inches. Accordingly, the counter 81 is suitable for keeping track of a total excursion of 9.99999 inches of the lead screw. It is apparent that, if a larger excursion is contemplated a decade counter having a larger number of stages would be used. Speaking only generally, since bi-directional counters are well-known, the six decade counter 81 comprises six individual but identically constructed stages 81-1 through 81-6. Each of them has two input lines and two output lines, with the input lines of each stage receiving UP and DOWN pulses from the immediately preceding stage. Each UP pulse received by a given stage increases the count state of the stage by one, and conversely each DOWN pulse received reduces the count state of the counter stage by one pulse. Each time a given counter stage is stepped from its ninth count state to its tenth count state it applies an UP pulse to the next higher order stage so as to advance its count state by one. Similarly each time that a given decade of the counter is stepped down from its zero count state, it applies in turn a DOWN outpulse to the next higher order counter decade, thereby reducing its count state by one.

In addition to the UP and DOWN outputs of the six decade stages, each of the stages also has a set of output lines on which the count state of the particular decade is signal in binary coded decimal form. Respective ones of these output lines are applied to a set of six display drive networks 83, each of which is in turn connected to one of a set of six display lamps shown collectively as the numerical display 85. The display drive networks 83–1 and 83–6 associated with respective ones of the decade counters 81–1 and 81–6 are operative to apply appropriate control signals to their associated display lamps 85 so as to cause each lamp to display a number corresponding to the count state of the decade counter to which the particular drive network is connected. In FIG. 7 the numerical display 85 is shown with the numbers 9.99999 appearing on its six lamps, indicating that the lead screw 23 is in its fully extended position. It will be recalled, however, that if desired, the numerical display 85 could be made to display 0.00000 for this position of the lead screw simply by reversing the setting of the control unit 79 and by resetting the counter 81 by means of the control unit 79 through a line 82. In that event, the count which appears on the numerical display 85 increases from 0.00000 to 9.99999 as the lead screw is turned counter-clockwise toward the handle portion of the micrometer.

As a further convenience, the counter 81 can be reset to zero through the line 82 from the control unit 79 at any position of the micrometer lead screw 23. This is particularly useful in measuring the distance traversed by a moveable element. Using the digital micrometer, a first measurement is made of the initial position of the moveable element by extending the lead screw of the digital micrometer until it abuts the element. The counter 81 is then reset to zero by means of the control unit 79. The only required reading is made when the element has reached its terminal position at which time the lead screw is threaded further into or out of the micrometer barrel until it again abuts the moveable element. The final count accumulated by the counter 81 tnd ment. The final count accumulated by the counter 81 and displayed by the numerical display unit 85 represents the total distance traveled by the moveable element. Conveniently, the operating mode of the direction sensing unit 77 can always be selected so that the counter 81 counts up regardless of whether the lead screw is advanced or retracted to follow the moveable element from its initial to its terminal position.

In contrast to the single reading of traversed distance made possible by the digital micrometer, when using a conventional micrometer two measurements must be made to determine the distance traveled by an element, one for its initial position and the other for its final position. One of these must then be subtracted from the other to obtain the net distance traveled and, as explained in the introductory portion of this description, each of these two measurements further entails the reading of three scales.

In the exemplary embodiment which has been described in detail a disk type optical encoder has been used. It will be apparent however, that differently configured optical encoders could also be used. For example, a rotatably mounted code member in the form of a cylinder could be employed instead of a disk, with the lamps being mounted inside the cylinder and the photodetectors mounted outside the cylinder but with the feature of mounting both the lamps and the photodetectors for axial translation with the rotatable code member being retained. Alternatively, of course, the relative positions of the lamps and the photodetectors could be reversed with the lamps being mounted on the outside of the code cylinder.

With reference to the particular form of encoder shown in FIG. 2, it will be appreciated that the dsk 29 functions merely as an adjunct of the sensing means comprising the lamps 35 and the photodetectors 37. Its function, as explained in detail previously, is to provide a plurality of transparent slots between the lamps and the photodetectors interspersed with opaque areas and adapted alternately to be in registry with similar transparent and opaque areas in the code disk 27 so that, as the code disk rotates, the amount of light reaching the photodetectors 37a and 37b varies in a well defined manner and in quadrature, thereby permitting the encoder to indicate the direction of movement by the lead screw 23 as well as its extent. While it has been found most effective when mounted adjacent the lamps 35, the disk 29 could be mounted on the other side of the code disk 27 adjacent the photodetectors 37. In the preferred embodiment, the photodetectors 37 as well as the lamps 35 are shown spaced 12° apart, as indicated in FIG. 3. This spacing is not critical. Ideally it would be desirable to provide the same location for both of the lamps 35a and 35b and photodetectors 37a and 37b so as to avoid errors which might be caused by eccentricity in the code disk 27. Of course, this is impossible and as a practical matter, an effort is made to place the two lamps 35a and 35b and their associated photodetectors 37a and 37b as close to one another as possible. Twelve degrees of arc has been found to be both practical and sufficiently small to afford good accuracy.

From the foregoing, it is apparent that there has been brought to the art of measuring instruments a significant and very useful improvement. By means of an encoder, the use of the conventional micrometer can be extended to many areas in which it was not suitable partly because of the skill required in manipulating it and partly because of the length of time required to take readings. Yet another field which is opened is that of self-recording which can be readily obtained by state-of-the-art digital print-out devices. Thus, it will be apparent that instead of connecting the output of the digital micrometer described herein to a readout device, it could instead be connected to the input of a digital printer adapted to print a number for each measurement made. Combined with such a readout, the digital micrometer of the present invention could be used by relatively unskilled personnel in the inspection of precision parts with a ready record of the inspection being made quickly and without subject to error by the inspecting personnel.

It will also be appreciated that the digital micrometer of the present invention can be manufactured by using a standard micrometer of conventional construction with minimal modifications which can be readily made and indeed which can be requested of the micrometer manufacturer. The only significant modifications that need to be made are the provision of openings for receiving the bearing 63, the anchoring rod cover 65 and the electronic circuit assembly 67, and the provision of a shoulder on the inside surface of the thimble 21 for receiving the hub of the rotor bracket 28. All of these can be requested of the micrometer manufacturer. As a result, the manufacture of the digital micrometer of the present invention can be undertaken without the tooling necessary for manufacturing micrometers but instead can be limited to the operations necessary to produce the encoder itself and to assemble it into the micrometer barrel.

What is claimed is:
1. A digital micrometer comprising in combination:
  (a) a frame member including a hollow cylindrical handle portion;
  (b) a measuring screw extending coaxially at least partially through and threadedly anchored in said handle portion;
  (c) an encoder rotor assembly including a code member mounted coaxially with said lead screw within said handle portion for rotation and axial translation with said lead screw relative to said handle portion, said code member having a plurality of indicia distributed in a circular array; and
  (d) an encoder stator assembly including
    (1) sensing means for individually signalling the movement of said indicia relative to said sensing means;
    (2) means for mounting said stator assembly within said handle portion upon said rotor assembly for joint axial movement of said assemblies relative to said handle member; and
    (3) anchoring means connected between said handle member and said stator assembly and slideably mounted in one of them for preventing rotation of said stator member relative to said handle member without preventing axial movement relative thereto.

2. A digital micrometer as defined in claim 1 and further characterized in that said means for mounting said stator assembly upon said rotor assembly includes a low friction precision bearing to permit said rotor assembly to rotate within said stator assembly while said assemblies are being axially moved with said lead screw.

3. A digital micrometer as defined in claim 2 and further characterized in that said anchoring means for preventing rotation of said stator assembly includes a rod rigidly mounted upon said stator assembly, extending in parallel to the axis of said lead screw and slidably journaled in a precision bearing within said handle portion in alignment with said rod.

4. A digital micrometer in accordance with claim 1 and further characterized in that:
  (a) said code member is a disk and its plurality of indicia are alternately transparent and opaque segments; and
  (b) said sensing means comprises
    (1) photodetecting means on one side of said disk, and
    (2) means on the other side of said disk for projecting light through transparent segments of said code disk at said photodetecting means.

5. A digital micrometer in accordance with claim 4 and further characterized in that:
  (a) said photodetecting means comprises a pair of closely spaced individual photodetectors;
  (b) said means for projecting light comprises a pair of light sources spaced apart in alignment with respective ones of said individual photodetecting means; and
  (c) said sensing means additionally includes a pair of screens between respective pairs of said photodetectors and light sources and adjacent said array of code disk segments, said screens having transparent and opaque segments of the same width as those of said code disk and so positioned relative to said code disk that the transparent segments of said code disk and of one of said screens are out of alignment with one another when the transparent segments of said code disk and of the other one of said screens are mutually aligned.

6. A digital micrometer comprising in combination:
  (a) a barrel;
  (b) a stationary internally threaded sleeve attached rigidly to said barrel;
  (c) a lead screw mounted for threaded engagement within the sleeve, said lead screw moving a predetermined distance axially relative to said sleeve for each degree of rotation within said sleeve; and
  (d) a rotary motion code converter, said converter including:
    (1) a code member mounted for rotation with said lead screw and having a plurality of regularly spaced indicia distributed in a circular array upon the surface of said member; and
    (2) sensing means slideably but non-rotatably mounted with respect to said sleeve adjacent said code member for producing an electrical signal in response to a predetermined amount of movement of said indicia past said sensing means.

7. A digital micrometer as defined in claim 6 further characterized by means for mounting said sensing means to move axially relative to said sleeve with said lead screw.

8. The digital micrometer as defined in claim 7 further characterized in that said means for mounting said sensing means includes a bearing mounted for axial movement with said lead screw and an annular bracket mounted upon said bearing for supporting said sensing means.

9. A digital micrometer comprising in combination:
(a) a frame;
(b) measuring means including
   (1) a thimble, and
   (2) a lead screw rigidly attached to said thimble and threadedly mounted in said frame to move a predetermined distance axially relative to said frame for each degree of turn within said frame;
(c) a code disk rigidly mounted upon said measuring means for continuous rotation with said lead screw in unchanging alignment therewith, said disk having a circular array of radially extending regularly spaced indicia upon its surface; and
(d) sensing means non-rotatably mounted relative to said frame in proximity to said disk for individually signalling the passage of said indicia past said stationary sensing means as said lead screw is turned.

10. A digital micrometer a defined in claim 9 further characterized in that:
(a) said frame includes a hollow barrel through which said lead screw extends coaxially;
(b) said code disk is housed within said barrel coaxially with said lead screw; and
(c) said sensing means is carried by an annular bracket mounted by a bearing upon said measuring means for axial movement in unison with said lead screw and anchored to said barrel to prevent said sensing means from rotating with said lead screw.

11. The digital micrometer defined in claim 10 further characterized by means for anchoring said sensing means to said barrel, said anchoring means including:
(a) a shaft rigidly mounted upon said annular bracket; and
(b) a bushing rigidly seated in said barrel and closely mated with said shaft slideably and snugly to receive said shaft.

12. A digital micrometer comprising in combination:
(a) a frame member including a hollow tubular handle portion;
(b) a measuring screw extending through and threadedly anchored in said handle portion;
(c) a code member mounted for rotation and axial translation with said measuring screw and enclosed within said handle portion, said member having a circular array of regularly spaced indicia distributed symmetrically about the axis of rotation of said measuring screw; and
(d) sensing means enclosed within said handle portion in proximity to said array of indicia and non-rotatably mounted relative to said frame member for producing an electrical signal representative of the total number of said indicia passing a given reference point as said screw turns.

13. A digital micrometer comprising in combination:
(a) a frame member including a hollow tubular handle portion;
(b) a measuring screw extending coaxially at least partially through and threadedly anchored in said handle portion;
(c) a code member mounted within said handle portion for rotation and axial translation with said measuring screw
   (1) said code member having a circular array of regularly spaced, alternately opaque and transparent segments distributed symmetrically about the axis of rotation of said measuring screw; and
(d) sensing means mounted non-rotatably completely within said handle portion and including:
   (1) a light source on one side of said code member, and
   (2) a photodetector on the other side of said code member.

14. A digital micrometer comprising in combination:
(a) a frame member including a calibrated, hollow cylindrical barrel;
(b) rotatable and laterally translatable mechanical measuring means including
   (1) a calibrated thimble at least partially enclosing said barrel; and
   (2) a lead screw rigidly connected to said thimble and extending coaxially at least partially through and threadedly anchored in said barrel;
(c) a code disk mounted within said barrel on said mechanical measuring means for rotation and lateral translation therewith relative to said barrel, said code disk having a circular array of regularly spaced, radially extending alternately transparent and opaque segments, distributed symmetrically about the axis of rotation of said lead screw;
(d) sensing means within said barrel adjacent said disk and including:
   (1) photodetecting means on one side of said disk, and
   (2) means on the other side of said disk for projecting light through transparent segments of said code disk at said photodetecting means;
(e) an annular housing for supporting said sensing means;
(f) a bearing mounting said housing upon and around said mechanical measuring means within said barrel; and
(g) a shaft rigidly extending from said housing and slideably journaled in said barrel to prevent said housing from rotating with said mechanical measuring means without interfering with the ability of said housing to move axially therewith.

15. A digital micrometer in accordance with claim 14 and further characterized in that:
(a) said photodetecting means comprises a pair of closely spaced individual photodetectors;
(b) said means for projecting light comprises a pair of light sources spaced apart in alignment with respective ones of said individual photodetecting means; and
(c) said sensing means additionally includes a pair of screens between respective pairs of said photodetectors and light sources and adjacent said array of code disk segments, said screen having transparent and opaque segments of the same width as those of said code disk and so positioned relative to said code disk that the transparent segments of said code disk and of one of said screens are out of alignment with one another when the transparent segments of said code disk and of the other one of said screens are mutually aligned.

References Cited

UNITED STATES PATENTS 2,835,979  5/1958  Metevia.
3,096,444  7/1963  Seward.
3,054,901  9/1962  Davidson.

FOREIGN PATENTS 1,359,029  3/1964  France.

WILLIAM D. MARTIN, Jr., Primary Examiner

U.S. Cl. X.R.

33—1, 125

UNITED STATES PATENT OFFICE
CERTIFICATE OF CORRECTION

Patent No. 3,482,321                                            December 9, 1969

Guy E. Inshaw

It is certified that error appears in the above identified patent and that said Letters Patent are hereby corrected as shown below:

Column 2, line 1, "sceondly" should read -- secondly --. Column 3, line 42, "or" should read -- of --; line 46, "asesmbl should read -- assembly --; line 58, after "in this way" insert -- through the bracket 28 and the thimble 21 --; line 58, "scerw" should read -- screw --; line 68, "respectives" should read -- respective --; line 69, "coded" should read -- code --. Column 4, line 11, "Sufficiently" should read -- Specifically --; line 39, "transporated" should read -- transported --. Column 5, line 56, between "to" and "point" cancel "a". Column line 47, "77." should read -- 77, --; line 74, "outpulse" shoul read -- output pulse --. Column 8, line 40, "tnd" should read -- and --; line 41, cancel "ment. the final count accumulated by the counter 81"; line 42, cancel "and"; line 74, "dsk" should read -- disk --.

Signed and sealed this 23rd day of June 1970.

(SEAL)
Attest:

EDWARD M.FLETCHER,JR.                      WILLIAM E. SCHUYLER, JR.
Attesting Officer                           Commissioner of Patents